Nov. 25, 1941.  F. N. WINNER  2,263,791
TIRE MOLD
Filed May 18, 1939
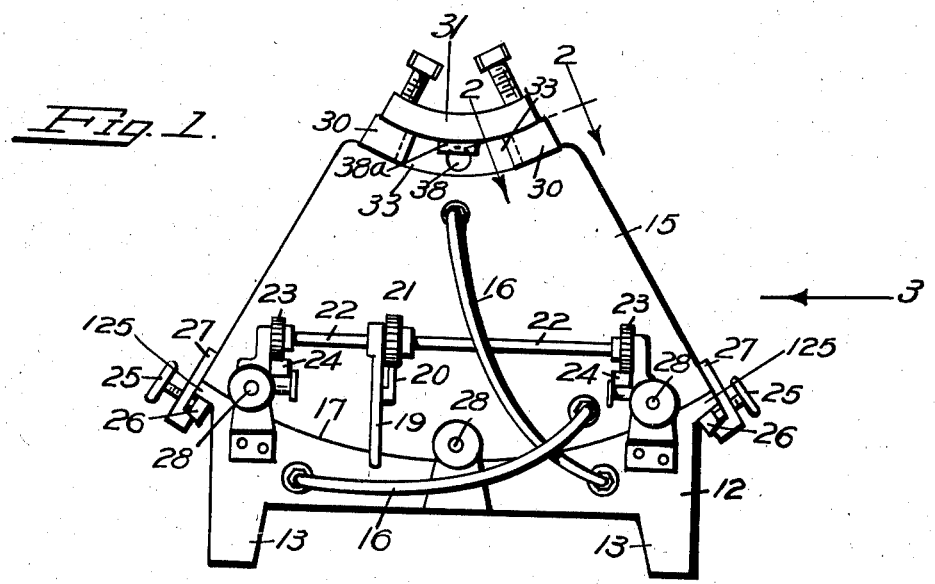
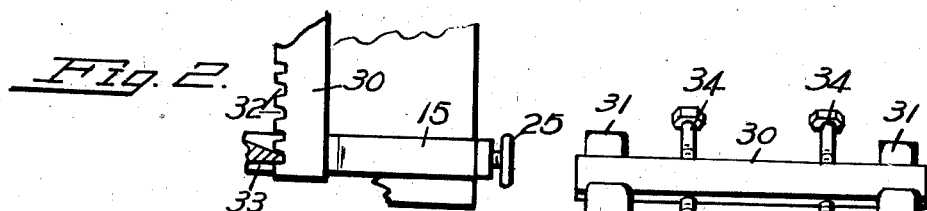
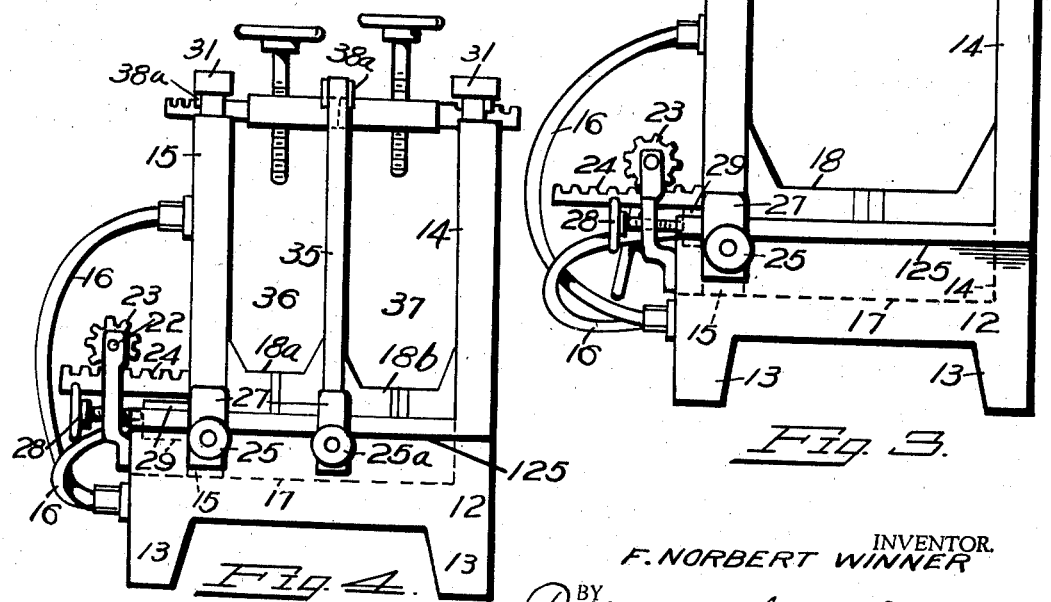
INVENTOR.
F. NORBERT WINNER
BY Rollandet, McGrew & Campbell
ATTORNEYS.

Patented Nov. 25, 1941

2,263,791

UNITED STATES PATENT OFFICE 2,263,791

TIRE MOLD

Frank Norbert Winner, Denver, Colo.

Application May 18, 1939, Serial No. 274,419

2 Claims. (Cl. 18—18)

This invention relates to improvements in tire repair molds.

As is well known to those skilled in the art, it is common practice to repair a tire that has been blown out or otherwise damaged, by applying to the damaged portion thereof raw compounds of rubber and cords or fabric impregnated with raw rubber compounds, after which the tire is placed in a sectional mold wherein the damaged part thereof may be simultaneously subjected to pressure by a pneumatic airbag and superatmospheric temperature to a predetermined degree for a predetermined length of time.

There is a wide spread in the sizes of rubber tires now in use. Various passenger automobiles have various sizes of tires, trucks usually have still larger tires, while tractors and roadbuilding machinery use tires of still larger cross sectional measurements. In operating a tire repair business, a tire repairman is called upon to repair tires of different cross sectional measurements, yet if he has a special mold to fit each and every tire size that he may be called upon to repair, the amount of equipment would be entirely out of proportion with the money he could hope to earn therefrom. In order properly to subject a tire being repaired, to pressure and heat, a mold must be provided that approximately fits the normal shape and size of the tire otherwise the tire would be forced out of shape during the vulcanization of the repair material.

Therefore, an object of the present invention is to provide a single combination tire repair mold that may be used to accommodate a wide variety of tire sizes.

Another object is to provide such a mold that may be connected with various sources of heat energy such as a gas burner and electric heating element or a steam pipeline.

A further object is to provide a mold of this character that can be selectively adapted to vulcanize a plurality of tires, of the same or different sizes, at one and the same time.

More specifically, a particular object of the invention is to provide a combination tire mold that may be used to vulcanize one tire of relatively large cross sectional measurement and later, optionally divided and adapted to vulcanize two tires of lesser cross sectional measurement, thus providing in one combination vulcanizer, apparatus that will enable a small shop operator to meet substantially any demand that he may encounter for repairing different sizes of tires.

Other objects and advantages reside in details of design and construction which will be more fully disclosed in the following description and in the drawing wherein like parts have been similarly designated, and in which:

Figure 1 is a side elevation of a tire repair mold that embodies the present inventive concept;

Figure 2 is a fragmentary sectional view taken along the line 2—2 of Figure 1;

Figure 3 is an elevation of the mold shown in Figure 1 and taken looking in the direction of arrow 3; and Figure 4 is an elevation of the same mold shown in Figures 1 and 2 and looking in the direction of arrow 3 of Figure 1, the mold in this view being divided and adapted for vulcanizing two tires of different sizes at one and the same time.

To illustrate a practical embodiment of the present inventive concept, the component parts of an improved combination mold built according to this invention, are illustrated in the drawing. Reference character 12 denotes a hollow base suitably supported on legs 13 and having one upstanding integral hollow side 14, the hollow interior of which is in communication with the hollow interior of the base 12. The interior of the base 12 and the side 14 are intended to be filled with steam or the like, which may be piped in from a pipeline not shown, or generated within by the application of heat directly to the bottom of the base 12. The exact means of supplying heat to the mold is no particular part of the present inventive concept.

Another hollow wall 15 is similar to the wall 14 but is movably mounted upon the base 12, and steam is supplied to said hollow wall 15 through hoselines 16 that connect the interior of the base 12 with that of the wall 15. The bottom of the base 12 is preferably flat while the upper surface of the base is of a general arcuate contour as shown at 17, Figure 1. The lower edge of the movably mounted hollow wall 15 is correspondingly arcuate in order to conform with and rest upon the upper arcuate surface of the base 12. The walls 14 and 15 together with the base 12, combine to provide a tire-receiving cavity having a substantially rectangular cross section as clearly shown in Figure 3.

A matrix 18 preferably made of heat conductive metal such as an aluminum alloy, is provided to fit in the mold as illustrated in Figure 3. The upper surface of the matrix 18 is shaped to approximately conform with the outside tread of some particular tire such as one of the standard relatively large truck or tractor tires. After the matrix 18 has been placed in the mold upon the upper surface of the base 12, the movable wall 15 may be moved inwardly to hold the matrix between itself and the stationary wall 14, by operating a ratchet handle 19 having a ratchet pawl 20 engaging a ratchet wheel 21 that is tightly mounted upon a shaft 22 to rotate gears 23. Gears 23 mesh with racks 24 attached to the movably mounted wall 15 so that upon rotation of the gears 23, the movably mounted wall 15 is moved inwardly or outwardly with reference to the base 12 according to the direction of rotation of said gears.

After the movably mounted wall 15 is drawn inwardly to contact the matrix 18, handwheels 25 may be used to draw wedge nuts 26 upwardly and outwardly with reference to the mold base 12, which movement clamps the movably mounted wall 15 into position through the intermediary of brackets 27 carried upon said movably mounted wall 15.

To further secure the movably mounted wall 15 in position and particularly to prevent its being forced laterally with reference to the base 12 when extremely high pressure is exerted by means of an airbag in a tire being repaired, a plurality of handscrews 28 are suitably mounted upon brackets attached to the base 12, in a position to thrust against pressure blocks 29 that in turn bear against lower portions of the movably mounted wall 15. It will be understood that various sizes of pressure blocks 29 may obviously be used according to the position of the movably mounted wall 15. It will be understood that various shapes and sizes of matrices 18 may optionally be used and the movable wall 15 brought in contact therewith by means of the ratchet mechanism hereinabove set forth, the wall 15 being held in its selected position by the operation of handscrews 25 and 28 in cooperation with wedge nuts 26 and pressure blocks 29.

After the proper matrix has been placed in the mold and the movably mounted wall 15 securely positioned, two cross bars 30 are laid across the top edges of the walls 14 and 15. Integral with the top edges of the walls 14 and 15 are upstanding clamp brackets 31, and notches 32 in the cross bars 30 engage beveled portions 33 of said brackets as shown best in Figure 2. Obviously, by this arrangement, the walls 14 and 15 are supported adjacent their upper edges against relative lateral movement. Screws 34 may be used to apply downward pressure upon bead plates to withstand the upward pressure of the expanding airbag within the tire being repaired as is common practice and will be understood by skilled operators in this art.

When a user desires to vulcanize two tires of smaller cross section such as, for instance, two ordinary passenger automobile tires, a partition 35 having a shape generally comparable to that of the movably mounted wall 15 may be placed in the mold to divide the same into two tire-receiving cavities 36 and 37 respectively. Matrices 18a and 18b may be positioned in the mold and the dividing partition 35 positioned therebetween and securely held by handwheels 25a. The clamping mechanisms 25 and 25a engage under flanges 125 that extend adjacent the cavities, for drawing the partition 35 and the movably mounted wall 15 downwardly toward the bottom of the cavity, which is the upper arcuate surface of the base 12. These clamping devices prevent upward movement of the dividing partition 35 and the movably mounted wall 15 with reference to the base 12 when the expansive force of a pneumatic airbag is exerted within a tire being vulcanized in the mold.

When the dividing partition 35 is used, two cross bars 30a are positioned end to end across the upper edges of the side walls 14 and 15 in abutting end relationship, and the outer end of each cross bar 30a may project through openings 38 that are provided in each upstanding clamp bracket 31 for the purpose. Each cross bar 30a may be notched similar to notches 32 in cross bar 30 to provide a support for the upper edges of the walls 14 and 15 to prevent their spreading apart under airbag pressure. The inner abutting ends of the cross bars 30a are each provided with a notch. Suitable plates as exemplified at 38a, are provided on each upstanding clamp bracket 31 and on both sides of the dividing partition 35 for cooperative engagement with the respective notches in said cross bars 30a. When airbag pressure is exerted within a tire being repaired in the mold, the cross bars will be forced upwardly and therefore the notches are on the upper surfaces of these cross bars. It is obvious that various sizes of matrices 18a and 18b may be used to fit the tires to be vulcanized.

Thus it will be seen that a mold according to the drawing and therefore according to a preferred form of the present inventive concept, may be used successfully to repair a wide variety of tires having different cross sections. Ordinarily, when the tire being repaired is of relatively large cross section such as a truck or tractor tire, only one tire is vulcanized at a time, the movably mounted wall 15 being positioned to fit the selected matrix 18 and the tire. When tires of smaller cross section such as ordinary passenger automobile tires, are to be repaired, the proper matrices 18a and 18b are selected and the dividing partition 35 converts a single cavity mold into a double cavity mold that in turn is adaptable to fit any standard tire of relatively small cross section.

This combination mold is an important advance in the art of manufacturing tire repair equipment because it completely fulfills the stated objects of this invention and enables a relatively small tire repair shop to handle a wide variety of tire sizes. Before the invention of this improved combination mold, many small tire repair shops were compelled to decline repair business offered them simply because they did not have the equipment properly to handle the work.

The particular feature of the present combination tire mold is that while the bottom of the tire-receiving cavity is of arcuate contour considered longitudinally, it is of substantially rectangular cross section. The object of this particular shape is to provide a surface along which the dividing partition 35 and the movably mounted wall 15 may be moved laterally and fit the mold perfectly in any selected position. Furthermore, a mold having a cavity of this rectangular cross sectional shape is very easily machined or otherwise surfaced.

While this specification discloses preferred means for reducing the present invention to practice and a preferred embodiment of the invention, changes may occur to those skilled in the art and may be made within the scope of the appended claims, without departing from this inventive concept.

What I claim and desire to secure by Letters Patent is:

1. A tire mold having a longitudinally arcuate tire-receiving cavity of substantially rectangular cross section and including a hollow steam-holding base and hollow upstanding sides one of which is movable with reference to the other, and having longitudinally projecting transverse flanges at opposite ends of the cavity adjacent the bottom thereof, a solid heat-conducting partition having an arcuate edge movably positioned in the cavity between said sides, brackets on the ends of said partition projecting downwardly and inwardly below said flanges, wedge-nuts positioned in cooperative relationship between said brackets and said flanges, hand screws threaded through said brackets and engaging the wedge-nuts for drawing the partition downwardly in the cavity, means for moving said movable side to selected positions with reference to other parts of the mold, means adjacent the bottom of the movable side for holding the same in selected positions, steam hose connecting the interior of the movable side with the interior of the base, the means adjacent the tops of the mold sides and the top of the partition for holding them in predetermined spaced relationship.

2. A tire mold having a longitudinally arcuate tire-receiving cavity of substantially rectangular cross section and including a hollow steam-holding base and hollow upstanding sides, and having longitudinally projecting transverse flanges at opposite ends of the cavity adjacent the bottom thereof, a solid heat-conducting partition having an arcuate lower edge movably positioned in the cavity between said sides, means at opposite ends of said partition positioned and adapted to engage said flanges for drawing said partition downwardly in said cavity against the bottom thereof, and means adjacent the tops of the mold sides and the top of the partition for holding them in selected spaced relationship.

F. NORBERT WINNER.